(12) United States Patent
Bowron

(10) Patent No.: US 6,295,948 B1
(45) Date of Patent: Oct. 2, 2001

(54) LITTER BOX

(75) Inventor: Brian K. Bowron, Temperance, MI (US)

(73) Assignee: Litter Flush, L.L.C., Temperance, MI (US)

( * ) Notice: Subject to any disclaimer, the term of this patent is extended or adjusted under 35 U.S.C. 154(b) by 0 days.

(21) Appl. No.: 09/390,586

(22) Filed: Sep. 3, 1999

Related U.S. Application Data

(60) Provisional application No. 60/099,251, filed on Sep. 4, 1998.

(51) Int. Cl.7 .................................................. A01K 1/035
(52) U.S. Cl. ................................................ 119/165
(58) Field of Search ................... 119/165, 166, 119/170

(56) References Cited

U.S. PATENT DOCUMENTS

| | | |
|---|---|---|
| D. 289,574 | 4/1987 | Stinner . |
| 3,100,474 * | 8/1963 | Schneider ............... 119/166 |
| 4,027,625 * | 6/1977 | Wheeler ................. 119/170 |
| 4,312,295 * | 1/1982 | Harrington ............. 119/167 |
| 4,593,645 | 6/1986 | Dingler . |
| 4,817,560 | 4/1989 | Prince et al. . |
| 5,113,801 | 5/1992 | Rotstein et al. . |
| 5,181,480 * | 1/1993 | Dabolt ................... 119/165 |
| 5,190,326 | 3/1993 | Nunn . |
| 5,259,340 | 11/1993 | Arbogast . |
| 5,267,530 | 12/1993 | Zamoyski . |
| 5,394,833 | 3/1995 | Glass . |
| 5,402,751 | 4/1995 | De La Chevrotiere . |
| 5,419,282 | 5/1995 | Dennis . |
| 5,460,122 | 10/1995 | Reinartz . |
| 5,499,611 | 3/1996 | Thomas . |
| 5,507,252 | 4/1996 | Ebert . |
| 5,509,379 | 4/1996 | Hoeschen . |
| 5,515,812 | 5/1996 | Faust . |
| 5,517,947 | 5/1996 | Christman . |
| 5,531,186 | 7/1996 | Flood et al. . |
| 5,544,620 | 8/1996 | Sarkissian . |
| 5,551,375 | 9/1996 | Flores . |
| 5,551,376 | 9/1996 | Lundeen et al. . |
| 5,564,366 | 10/1996 | Hancock . |
| 5,566,640 | 10/1996 | Krumrei . |
| 5,622,140 | 4/1997 | McIlnay-Moe . |
| 5,642,814 | 7/1997 | Nelson . |
| 5,645,013 | 7/1997 | Redmond, Sr. . |
| 5,983,831 * | 11/1999 | Thompson ............. 119/166 X |

* cited by examiner

Primary Examiner—Robert P. Swiatek
(74) Attorney, Agent, or Firm—Emch, Schaffer, Schaub & Porcello Co., L.P.A.

(57) ABSTRACT

The litter box has a box having a bottom and a side wall that extends from the bottom. The side wall terminates in an edge that is spaced apart from the bottom of the box. A container for receiving litter is positioned on the box. The container has a side wall that is substantially the same shape and size as the side wall of the box. A flange extends from the side wall of the container. The flange is disposed to extend over the edge of the side wall of the box to position the container on the box. An opening is positioned in a portion of the side wall of the container. The opening is disposed adjacent the flange on the side of the flange that is spaced apart from the box. A groove is positioned on the interior side of a portion of the side wall of the container. The groove is positioned adjacent the flange and is on the side of the flange that is spaced apart from the box. A tray extends through the opening and slideably engages the groove in the side wall of the container. The tray provides a removable floor for the container and separates the container from the box. Litter in the container is positioned on the tray. The tray is moveable in the opening the groove to allow litter that is soiled to fall into the box where the litter can be retained out of sight and with reduced odor. The tray can then be repositioned in the groove to form a floor for the container and fresh litter can be positioned on the tray.

10 Claims, 3 Drawing Sheets

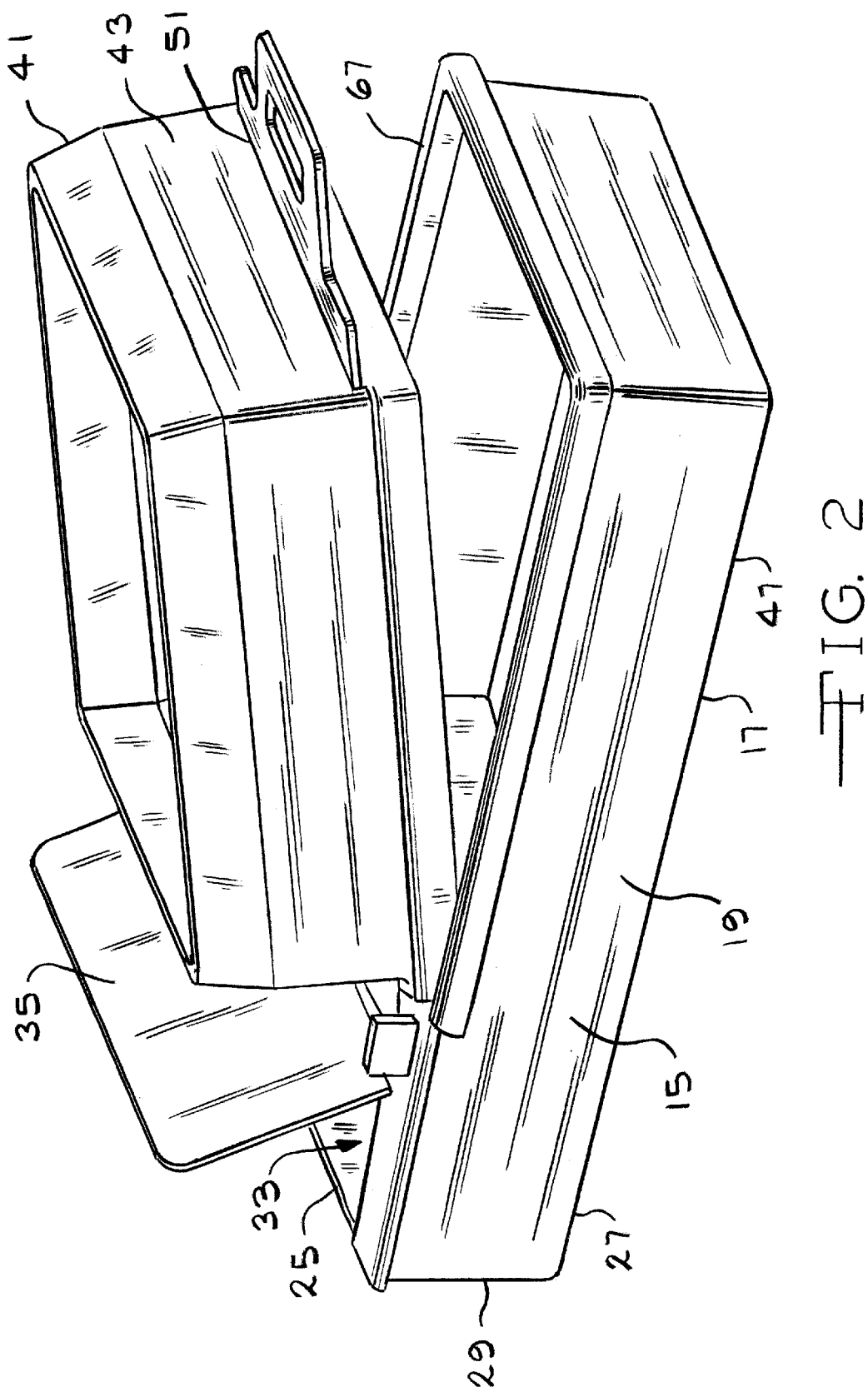

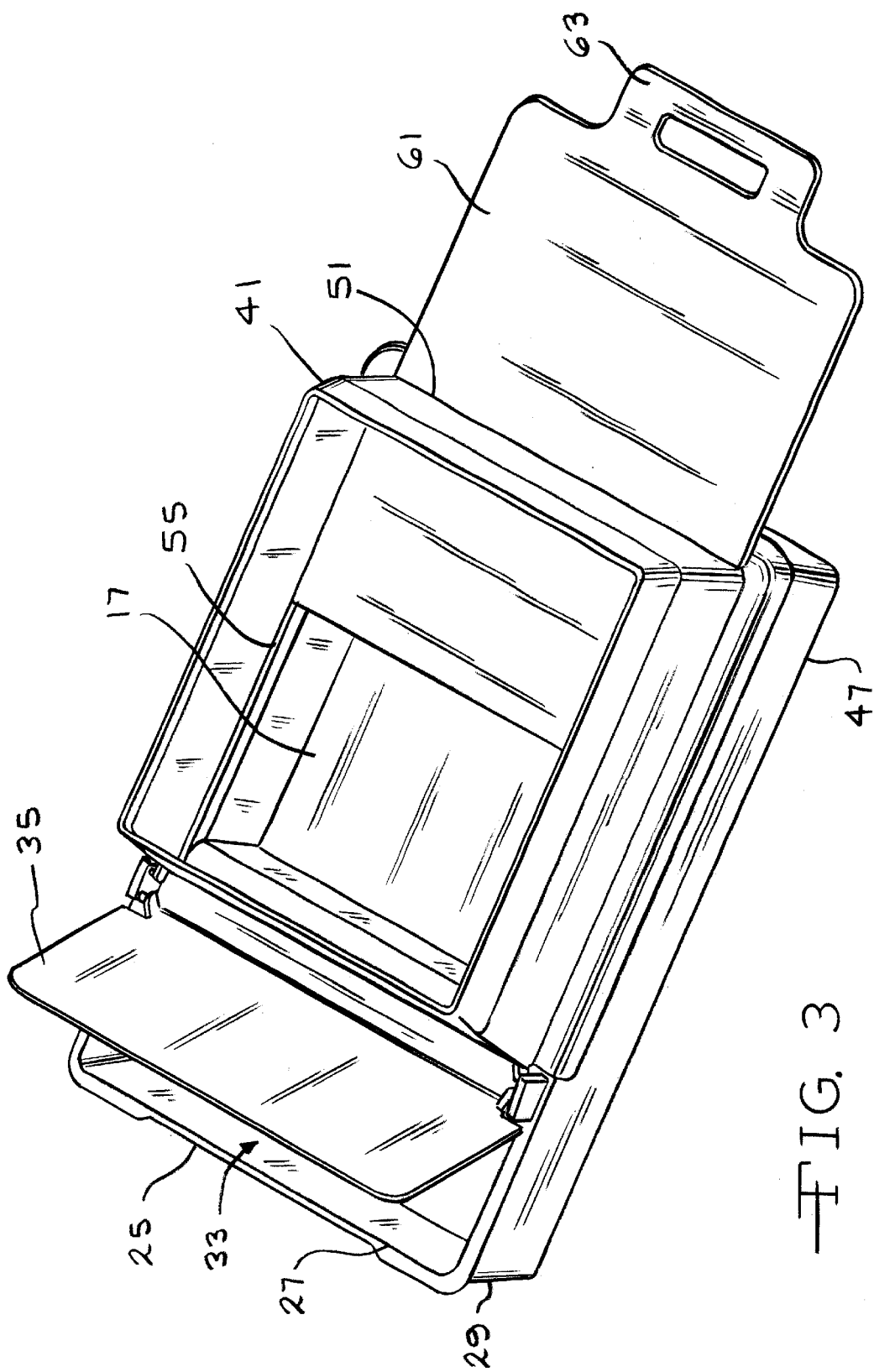

LITTER BOX

This application claims the benefit of U.S. Provisional Patent Application Ser. No. 60/099,251 filed Sep. 4, 1998.

BACKGROUND OF THE INVENTION

The invention relates to a litter box for use with cats and other animals. More particularly, the invention relates to a litter box having a storage compartment for the soiled litter where the soiled litter is out of sight and odors from the soiled litter are reduced.

Litter boxes for cats and others animals have been available for many years. The prior art litter boxes are generally a container where granular litter is positioned on the floor or base of the container. The soiled litter must be removed from the box on a daily basis and disposed of. However, it is not always convenient to dispose of the soiled litter especially since the volume of soiled litter may be relatively small any particular day.

SUMMARY OF THE INVENTION

It is an object of the present invention to provide a litter box whereby soiled litter can be removed and stored in a storage compartment. The soiled litter is stored in a location that is out of sight in a location that contains and reduces any odor from the soiled litter. The litter box of the present invention has a box having a bottom and a side wall that extends from the bottom. The side wall terminates in an edge that is spaced apart from the bottom of the box. A container for receiving litter is positioned on the box. The container has a side wall that is substantially the same shape and size as the side wall of the box. A flange extends from each side wall of the container. The flange is disposed to extend over the edge of the side walls of the box to position the container on the box. An opening is positioned in a portion of the side wall of the container. The opening is disposed adjacent the flange on the side of the flange that is spaced apart from the box. A groove is position in the interior side of a portion of the side wall of the container. The groove is positioned adjacent the flange and is on the side of the flange that is spaced apart from the box. A tray extends through the opening and slideably engages the groove in the side wall of the container. The tray provides a removable floor for the container and separates the container from the box. Litter in the container is positioned on the tray. The tray is moveable in the opening and along the groove to allow litter that is soiled to fall into the box where the litter can be retained out of sight and with reduced odor. The tray can then be repositioned in the groove to form a floor for the container and fresh litter can be positioned on the tray.

Other objects and advantages of the present invention will become apparent to those skilled in the art upon a review of the following detailed description of the preferred embodiments and the accompanying drawings.

BRIEF DESCRIPTION OF THE DRAWINGS

FIG. 2 is a perspective view looking down at the top of the litter box; and

FIG. 3 is a side perspective view with the litter container elevated.

DETAILED DESCRIPTION OF THE PREFERRED EMBODIMENT(S)

Figure 1:
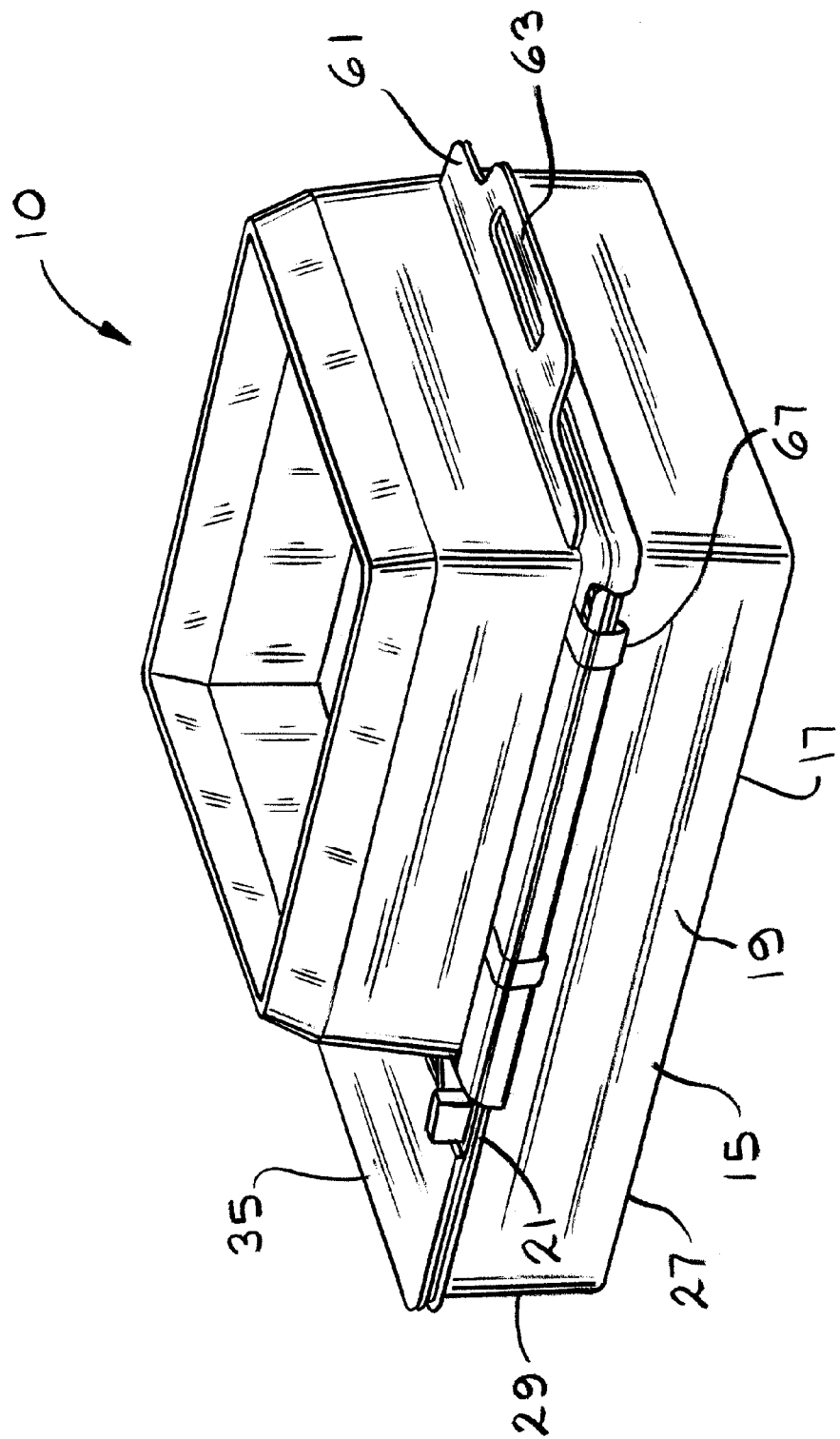
FIG. 1 is a side perspective view of the litter box of the present invention.

The invention relates to a litter box which can be used for animals such as cats. More particularly, the litter box has a storage compartment for soiled litter where the litter ca n be retained out of sight and with reduced odor. The features of the invention will be more fully understood by referring to the attached drawings in connection with the following description.

The litter box 10 has a lower box 15 having a bottom 17 and a side wall 19. The side wall 19 extends from the bottom and terminates in an edge 21 that is spaced apart from the bottom 17. In a preferred embodiment, the side wall 19 has a substantially square or rectangular shape and can be comprised of two end walls and two opposing walls.

The litter box 10 can also include a litter bin 25 that is positioned adjacent the lower box 15. The litter bin 25 has a bottom 27 and a side wall 29 that define a storage compartment 33 for the litter. A hinged lid 35 can be connected to the side wall 29 to close the storage compartment 33. In some applications, it may be desirable to form the litter bin 25 as a portion of the lower box 15 as shown in the drawings. In this instance, the side wall 19 of the lower box 15 and the side wall 29 of the litter bin 25 are the same and a partition 37 is positioned between the lower box 15 and the litter bin 25 to separate these components of the litter box 10. In such embodiments, the partition 37 can comprise one of the end walls of the box.

A container 41 for receiving litter is positioned on the lower box 15. The container 41 has a side wall 43 that is substantially the same shape and size as the side wall 19 of the lower box 15. In a preferred embodiment, the sidewall 43 has a substantially square or rectangular shape and can be comprised of two end walls and two opposing walls. A flange 47 extends from the side wall 43 of the container 41. The flange 47 is disposed to extend over the edge 21 of the side wall 19 of the lower box 15. The flange 47 acts to position the container 41 on the lower box 15. An opening 51 is positioned in a portion of the side wall 43 of the container 41. The opening 51 is disposed adjacent the flange 47. The opening 51 is on the side of the flange 47 that is spaced apart from the lower box 15. A groove 55 is positioned in the interior side of a portion of the side wall 43 of the container 41. The groove 55 is positioned adjacent the flange 47 and is on the side of the flange 47 that is spaced apart from the lower box 15. A tray 61 extends through the opening 51 and slidably engages the groove 55 in the side wall 43 of the container 41. The tray 61 provides a removable floor for the container 41 and separates the container 41 from the lower box 15. In use, the litter is positioned on the tray 61. A handle 63 can be positioned off an end of the tray 61 that extends beyond the opening 51 to facilitate slideable movement of the tray in the groove 55 in the opening 51.

In operation, the litter is positioned on the tray 61 that forms the floor for the container 41 that is positioned on the lower box 15. When the litter on the tray 61 becomes soiled, the tray 61 can be slideably advanced through the opening 51 in a direction away from the container 41 such that the container 41 is in communication with the lower box 15. As the tray 51 is moved to this open position, the soiled litter can be pushed into the lower box 15 or just allowed to fall into the lower box. As shown in FIG. 2, the container 41 can be raised or tilted, preferably in a pivoting or hinging manner, to assist in slideably moving the soiled litter to the lower box 15. The handle 63 on the tray 61 can be used to facilitate tilting of container 41. When the soiled litter is in the lower box 15, the tray 61 is advanced in the direction toward the box 15 and the container 41 to again form the floor in the container 41. Additional fresh litter can be positioned on the tray 61 as needed. The soiled litter is retained in the lower box 15 out of sight. The positioning of the tray 61 in the container 41 separates the container 41 from the lower box 15 and acts to contain any odor from the soiled litter in the lower box 15. Soiled litter can be dumped into the lower box 15 several times before it is necessary to empty the lower box 15.

The litter storage compartment 33 that is positioned the lower box 15 provides a very convenient storage facility for fresh litter that can be positioned on the tray 61 as needed.

In certain circumstances, it may be desirable to position a plastic bag (not shown) in the lower box 15 so that the soiled litter will be held in the plastic bag. The plastic bag can be removed from the lower box 15 when it is time to dispose of the soiled litter. At least one retainer clip 67 (as shown in FIG. 1) can be secured to the edge 21 of the side wall 19 of the lower box 15 to retain the plastic bag in the desired position in the lower box 15.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A litter box comprising:

a box having a bottom and a sidewall that extends from said bottom, said sidewall terminating in an edge that is spaced apart from said bottom;

a container positioned on said box, said container having a sidewall that is substantially the same shape and size as said sidewall of said box, a flange extending from said sidewall of said container, said flange being disposed to extend over said edge of said sidewall of said box to position said container on said box;

an opening positioned in a portion of said sidewall of said container, said opening being disposed adjacent said flange and on a side of said flange that is spaced apart from said box;

a groove positioned on the interior side of a portion of said sidewall of said container, said groove being adjacent said flange and on said side of said flange that is spaced apart from said box; and, a tray extending through said opening and slideably engaging said groove on said sidewall of said container, whereby said tray acts as a removable floor for said container that separates said container from said box, said container being positioned on said tray for receiving a supply of litter, said tray being slideably moveable in said opening and said groove to allow any litter that is soiled to fall into said box where the soiled litter can be retained out of sight and with reduced odor until the soiled litter is removed, said tray is then repositioned in said groove to form said floor for said container and fresh litter can be positioned on said tray and a bin for fresh litter formed as a portion of the box and extending outwardly beyond said container sidewall.

2. The litter box of claim 1 wherein said box and said container are substantially square or rectangular and have end walls and opposing walls.

3. The litter box of claim 2 wherein said opening is positioned in one end wall of said side wall of said rectangular container and said groove is positioned in opposed walls that extend from said wall where said opening is located.

4. The litter box of claim 1 wherein said tray has a handle portion that extends beyond said opening when said tray is positioned in said groove to form said floor for said container, said handle portion facilitating the movement of said tray.

5. The litter box of claim 1 wherein a plastic bag can be positioned in said box to receive said soiled litter form said container.

6. The litter box of claim 5 wherein at least one retainer clip can be positioned on said edge of said sidewall of said box to secure said plastic bag in said box.

7. The litter box of claim 1 wherein a bin for fresh litter is positioned adjacent said box.

8. The litter box of claim 1 wherein said container is tiltably moveably, whereby the soiled litter can be slideably moved along said tray for disposal in said box.

9. A litter box comprising:

a box having a bottom and a sidewall that extends from said bottom, said sidewall terminating in an edge that is spaced apart from said bottom;

a container positioned on said box, said container having a sidewall that is substantially the same shape and size as said sidewall of said box, a flange extending from said sidewall of said container, said flange being disposed to extend over said edge of said sidewall of said box to position said container on said box;

an opening positioned in a portion of said sidewall of said container, said opening being disposed adjacent said flange and on a side of said flange that is spaced apart from said box;

a groove positioned on the interior side of a portion of said sidewall of said container, said groove being adjacent said flange and on said side of said flange that is spaced apart from said box;

a tray extending through said opening and slideably engaging said groove on said sidewall of said container, whereby said tray acts as a removable floor for said container that separates said container from said box, said container being positioned on said tray for receiving a supply of litter, said tray being slideably moveable in said opening and said groove to allow any litter that is soiled to fall into said box where the soiled litter can be retained out of sight and with reduced odor until the soiled litter is removed, said tray is then repositioned in said groove to form said floor for said container and fresh litter can be positioned on said tray; and, a bin for fresh litter positioned adjacent said box, wherein said bin for fresh litter is formed as a portion of said box, and wherein an end wall of said box forms a partition between said bin and said box.

10. The litter box of claim 9 wherein said bin further comprises a moveable lid.

* * * * *